(12) United States Patent
Stamps et al.

(10) Patent No.: US 10,322,798 B2
(45) Date of Patent: Jun. 18, 2019

(54) ROTOR YOKE AND METHOD OF MAKING THE SAME

(71) Applicant: TEXTRON INNOVATIONS INC., Providence, RI (US)

(72) Inventors: Frank B. Stamps, Colleyville, TX (US); Pat Tisdale, Roanoke, TX (US); Bryan Marshall, Mansfield, TX (US); Tom Campbell, Keller, TX (US)

(73) Assignee: Textron Innovations Inc., Providence, RI (US)

( * ) Notice: Subject to any disclaimer, the term of this patent is extended or adjusted under 35 U.S.C. 154(b) by 516 days.

(21) Appl. No.: 14/955,830

(22) Filed: Dec. 1, 2015

(65) Prior Publication Data

US 2016/0083086 A1 Mar. 24, 2016

Related U.S. Application Data

(62) Division of application No. 13/501,594, filed as application No. PCT/US2009/060450 on Oct. 13, 2009, now Pat. No. 9,199,731.

(51) Int. Cl.
*B64C 27/33* (2006.01)
*B64C 27/32* (2006.01)
(Continued)

(52) U.S. Cl.
CPC .............. *B64C 27/32* (2013.01); *B29C 35/02* (2013.01); *B29C 43/18* (2013.01); *B29C 70/026* (2013.01);
(Continued)

(58) Field of Classification Search
CPC ..................................................... B64C 27/32
See application file for complete search history.

(56) References Cited

U.S. PATENT DOCUMENTS 4,293,276 A 10/1981 Brogdon et al.
5,429,879 A 7/1995 Syn et al.
(Continued)

FOREIGN PATENT DOCUMENTS

EP 0648593 A2 4/1995
GB 2033861 A 5/1980
(Continued)

OTHER PUBLICATIONS

Extended European Search Report dated Dec. 7, 2012 from related counterpart App. No. 09850460.8.
(Continued)

*Primary Examiner* — Kayla Mccaffrey
(74) *Attorney, Agent, or Firm* — James E. Walton (57) ABSTRACT

A rotor yoke manufactured by a process comprising preparing a molded rotor yoke in a closed cavity tool and possibly machining at least one portion of the molded rotor yoke to form the rotor yoke. In the preferred embodiment, the preparing of the molded rotor yoke is accomplished by applying layers of uncured low-flow composite material and a layer of uncured high-flow adhesive; substantially enclosing the uncured molded rotor yoke in the closed cavity tool; and applying pressure so as to compress the uncured molded rotor yoke; and curing the uncured molded rotor yoke. During the curing process, the high-flow adhesive bleeds out of the molded rotor yoke, thereby preventing marcels from forming through movement of the low-flow composite material.

16 Claims, 5 Drawing Sheets

(51) Int. Cl.
  *B29C 70/02*   (2006.01)
  *B29C 70/46*   (2006.01)
  *B29C 35/02*   (2006.01)
  *B29C 43/18*   (2006.01)
  *B29K 63/00*   (2006.01)
  *B29K 309/08*  (2006.01)
  *B29L 31/30*   (2006.01)

(52) U.S. Cl.
  CPC ............... *B29C 70/46* (2013.01); *B64C 27/33* (2013.01); *B29K 2063/00* (2013.01); *B29K 2309/08* (2013.01); *B29L 2031/3088* (2013.01)

(56) References Cited

U.S. PATENT DOCUMENTS

| | | | |
|---|---|---|---|
| 2,786,285 | A | 7/1998 | Walla et al. |
| 5,939,006 | A | 8/1999 | Wang et al. |
| 6,311,542 | B1 | 11/2001 | Sloman |
| 7,201,863 | B1 | 4/2007 | Ehrfield et al. |
| 8,419,375 | B2 * | 4/2013 | Hiros ............... B64C 27/33 416/134 A |
| 2005/0077007 | A1 | 4/2005 | Healey |
| 2005/0086916 | A1 | 4/2005 | Caron |
| 2006/0182949 | A1 | 8/2006 | Salnikov |
| 2007/0044919 | A1 | 3/2007 | Hoffman |
| 2010/0151239 | A1 | 6/2010 | Herbert et al. |

FOREIGN PATENT DOCUMENTS

| | | | |
|---|---|---|---|
| GB | 2449146 | A | 11/2008 |
| WO | 8505069 | A1 | 11/1985 |
| WO | 2009096964 | A1 | 8/2009 |

OTHER PUBLICATIONS

Office Action dated Jul. 18, 2013 from related counterpart App. No. 09850460.8.
First Office Action dated Apr. 25, 2014 from related counterpart CN App. No. 200980161914.3.
International Search Report and Written Opinion of the International Searching Authority dated Dec. 10, 2009 from counterpart PCT App. No. PCT/US2009/060450.
International Report on Patentability dated Nov. 23, 2011 from counterpart PCT App. No. PCT/US2009/060450.
Office Action dated Dec. 16, 2013 from related counterpart CA App. No. 2,776,045.
Requirement for Restriction/Election dated Oct. 28, 2014 from related U.S. Appl. No. 13/501,594.
Response to Election/Restriction dated Dec. 17, 2014 from related U.S. Appl. No. 13/501,594.
Non-final Office Action dated Jan. 23, 2015 from related U.S. Appl. No. 13/501,594.
Amendment dated Apr. 23, 2015 from related U.S. Appl. No. 13/501,594.
Final Office Action dated May 14, 2015 from related U.S. Appl. No. 13/501,594.
Response After Final Action dated Jul. 10, 2015 from related U.S. Appl. No. 13/501,594.
Notice of Allowance dated Jul. 29, 2015 from related U.S. Appl. No. 13/501,594.
First Examination Report dated Mar. 16, 2018 from counterpart IN App. No. 2746/DELNP/2012.

* cited by examiner

ROTOR YOKE AND METHOD OF MAKING THE SAME

CROSS REFERENCE TO RELATED APPLICATIONS

This is a divisional application of U.S. application Ser. No. 13/501,594, filed 12 Apr. 2012, titled "Rotor Yoke and Method of Making the Same," which is a National Stage Entry of P.C.T. Application No. PCT/US2009/060450 filed 13 Oct. 2009, titled "Rotor Yoke and Method of Making the Same," both of which are hereby incorporated by reference for all purposes as if fully set forth herein.

TECHNICAL FIELD

The present application relates to rotorcraft and, in particular, to yokes for coupling helicopter blades to a mast.

BACKGROUND

Each blade of the main rotor assembly of a rotorcraft must be connected to a main support mast, usually by means of a rotor yoke, in a manner allowing several degrees of freedom. Such an interconnection is subjected to high and repeated stresses of both torsional and centrifugal natures, and is therefore an extremely important component of the aircraft. Each blade must be able to rotate about its longitudinal axis to provide pitch control. Each blade must be able to flap in a direction perpendicular to the rotor plane to accommodate vertical loads. In some instances, each blade must be able to pivot within the rotor plane to provide for lead-lag control. The manner in which the blades are secured to the main support mast enables a rotorcraft to be controlled and maneuvered in flight.

Various types of rotor yokes have been utilized to interconnect the rotorcraft blades and the support mast. Metal rotor yokes have suffered from the disadvantages of weight, cost, high maintenance requirements, and low useful life. There have been several attempts to eliminate one or more of the articulations in such couplings in order to simplify construction and reduce costs. Some rotor yokes are pivotally secured to the support mast, and are characterized by a flat plate construction resilient enough to act as a virtual hinge and thereby accommodate flapping of the blades.

Figure 1:
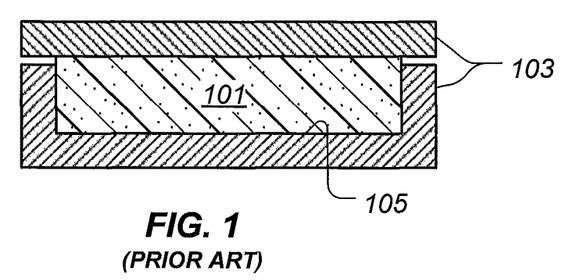
FIGS. 1 and 2 are stylized, cross-sectional views illustrating a conventional method for manufacturing a composite rotor yoke for a rotorcraft according to prior art.
Figure 2:
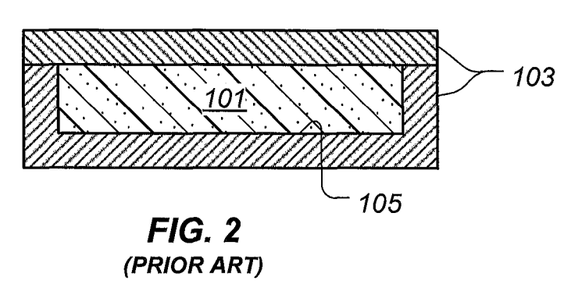

More recently, glass fibers and other composite materials have been employed in the fabrication of rotorcraft rotor system components. In comparison to a machined metal forging, glass fibers and other composite materials have more favorable fatigue characteristics resulting in longer useful life. In addition, the use of such materials simplifies construction and reduces costs. Referring to FIGS. 1 and 2, composite rotor yokes, such as a rotor yoke 101 are conventionally cured in a rigid, closed mold, such as mold 103, to form the overall shape of the rotor yoke. One of the problems encountered concerning such rotorcraft rotor yokes has been distortion or "marcelling" of the fibers in the rotor yoke during the curing process. Because the uncured rotor yoke is forced to conform to the cavity, such as cavity 105 formed by the closed mold, mechanical stresses can be induced in the uncured rotor yoke. The fibers are substantially unconstrained during certain portions of the curing cycle when the resin matrix in which the fibers are disposed is in a semi-liquid or liquid state. The induced stress in the uncured rotor yoke is relieved via movement or distortion of the fibers within the resin matrix. The fibers can be captured in their distorted or marcelled state when the resin crosslinks in thermosetting composite materials or when the resin is cooled in thermoplastic composite materials.

There are many designs of rotorcraft yokes well known in the art; however, considerable shortcomings remain.

BRIEF DESCRIPTION OF THE DRAWINGS

The novel features believed characteristic of the present application are set forth in the appended claims. However, the system itself, as well as a preferred mode of use, and further objectives and advantages thereof, will best be understood by reference to the following detailed description when read in conjunction with the accompanying drawings, in which the leftmost significant digit(s) in the reference numerals denote(s) the first figure in which the respective reference numerals appear, wherein:

While the system of the present application is susceptible to various modifications and alternative forms, specific embodiments thereof have been shown by way of example in the drawings and are herein described in detail. It should be understood, however, that the description herein of specific embodiments is not intended to limit the present application to the particular forms disclosed, but on the contrary, the intention is to cover all modifications, equivalents, and alternatives falling within the spirit and scope of the present application as defined by the appended claims.

DESCRIPTION OF THE PREFERRED EMBODIMENT

The system of the present application represents a composite rotor yoke for a rotorcraft produced using a closed cavity curing tool. Preferably, the composite rotor yoke is laid-up using an automated fiber placement process, but may also be laid-up by hand. After curing, the cured composite rotor yoke may be machined to add any desired features.

Illustrative embodiments of the present application are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

As used herein, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

Figure 3:
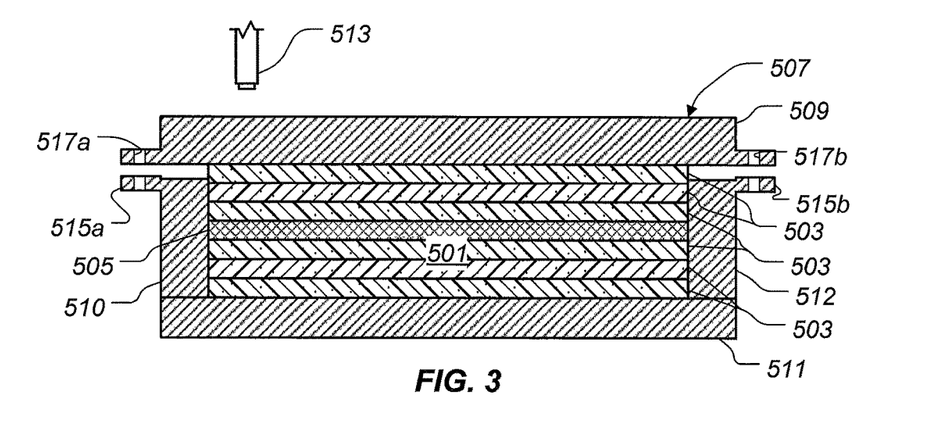
FIGS. 3-5 are stylized, cross-sectional views depicting the method of manufacturing a composite molded rotor yoke according to the preferred embodiment of the present application.
Figure 4:
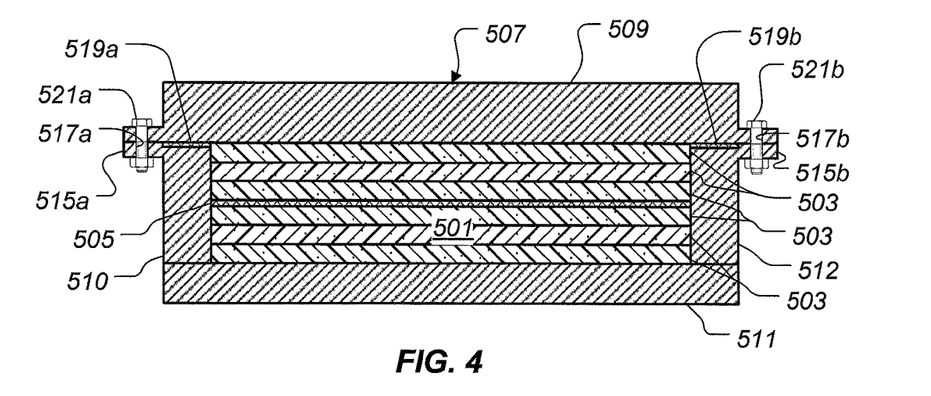
Figure 5:
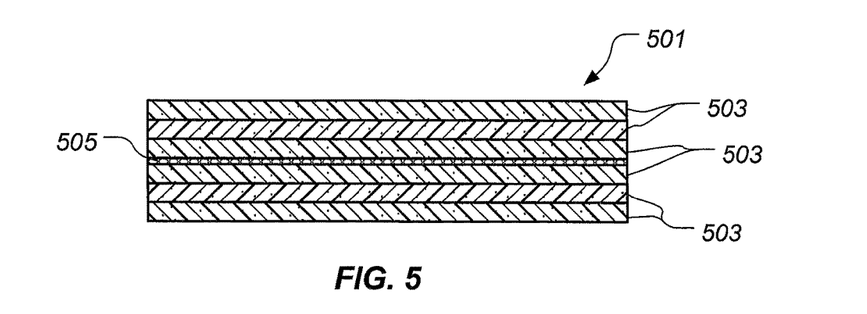

Referring to FIGS. 3-5 in the drawings, the preferred embodiment of a composite molded rotor yoke 501 of a rotor yoke 901 (shown in FIG. 10) is fabricated by applying a plurality of layers of an uncured low-flow composite material 503 and a layer of a high-flow adhesive 505 into a closed cavity tool 507. Note that the geometric configuration of tool 507 is merely exemplary of the widely diverse geometric configurations of closed cavity tools contemplated by the present application. It should be appreciated that tools 509, 510, 511, and 512 may be split into multiple tools, or combined to form a fewer number of tool parts. For example, side tools 510 and 512 may be integrated into a second tool 511 so as to form one integral tool part. Closed cavity tool 507 preferably has a rigid first tool 509, a rigid second tool 511, and rigid side tools 510 and 512. However, closed cavity tool 507 may also have a semi-rigid first tool 509, a semi-rigid second tool 511, semi-rigid side tools 510 and 512, or any combination of semi-rigid and rigid tools 509, 511, 510, and 512. Closed cavity tool 507 provides tolerance and contour control by conforming the primary surfaces of molded rotor yoke 501 to the inside surfaces of closed cavity tool 507. Closed cavity tool 507 may also be referred to as a "two-sided" tool or other language describing that tool 507 substantially encloses molded rotor yoke 501.

Uncured, composite molded rotor yoke 501 is formed when the desired number of layers, also referred to as "plies", of low-flow composite material 503 and high-flow adhesive 505 have been applied into tool 507, in the desired geometry. Layers of low-flow composite material may be laid by hand, or by fiber placement machine 513. High-flow adhesive 505 may also be laid by hand, or by a machine similar to fiber placement machine 513. Closed cavity tool 507 is capable of compressing molded rotor yoke 501 into a desired thickness and geometry. Closed cavity tool 507 may include stops 515a and 515b so that first tool 509 and second tool 511 of tool 507 will stop the compression of molded rotor yoke 501 at the desired thickness of molded rotor yoke 501. Closed cavity tool 507 may also include fastener holes 517a and 517b so that closed cavity tool 507 could be fastened closed with fasteners 521a and 521b at any time during or after the curing process.

Uncured low-flow composite material 503 preferably includes glass fibers disposed in an uncured epoxy, in the form of a prepreg, although the present application contemplates other materials for molded rotor yoke 501. An example of low-flow composite material 503 is HexPly 8552 made by Hexcel Composites. For this application, the term "prepreg" is typically sheets of fibers impregnated in uncured epoxy or adhesive. Uncured low-flow composite material 503 can then be cut to size and laid into tool 507, either by hand or with fiber placement machine 513. Low-flow composite material 503, if used in the absence of high-flow adhesive 505, could be any composite material that has such a high viscosity so as to possibly produce marcels when subjected to a curing process inside a closed cavity tool 507. "Marcels" are wrinkles in the fiber structure of a composite that severely compromise the structural integrity of a composite part. Marcels are often created when low-flow composite material 503, if used in the absence of high-flow adhesive 505, is forced to conform to the inside surface of closed cavity tool 507, causing the highly viscous epoxy to flow and distort fibers. Complete curing of the distorted fibers, or marcels, causes the fibers to be permanently fixed in the marcelled state.

The system of the present application seeks to at least prevent the formation of "marcels" by applying layers of uncured low-flow composite material 503, as well as a layer of uncured high-flow adhesive 505, in a configuration to produce molded rotor yoke 501. In an alternative embodiment, a plurality of layers of high-flow adhesive 505 may also be used in conjunction with a plurality of layers of low-flow composite material 503, to form molded rotor yoke 801 (see FIG. 9). The use of uncured high-flow adhesive 505 in conjunction with low-flow composite material 503 provides a material with low viscous properties that easily bleeds out of tool 507 during curing, thereby preventing low-flow composite material 503 from forming marcels. An example of high-flow adhesive 505 is AF163 made by 3M. High-flow adhesive 505 is preferably, in its uncured state, a film, but may also be a paste. High-flow adhesive 505 may also be impregnated with fibers or scrim in order to tailor strength and final thickness control.

FIG. 4 depicts molded rotor yoke 501 during the curing process. Closed cavity tool 507 has been compressed in order to rid the part of any voids, or air bubbles, and to conform molded rotor yoke 501 to the contours of two sided tool 507. Mechanical stops 515a and 515b of second tool 511 are shown in contact with first tool 509. Contact between stops 515a and 515b, and first tool 509, signify the desired final thickness of molded rotor yoke 501 has been reached. Bleed outs 519a and 519b of high-flow adhesive 505 are caused from compression of tool 507. During curing, high-flow adhesive 505 may either partially or completely bleed out from molded rotor yokes 501 and 801, depending on parameters controlling compression of tool 507. Because high-flow adhesive 505 has a lower viscosity than that of low-flow composite material 503, high-flow adhesive 505 bleeds out of tool 507 instead of low-flow composite material 503. In some embodiments, the viscosity difference between high-flow adhesive 505 and low-flow composite material 503 may not be large, which could result in bleed outs 519a and 519b being a combination of high-flow adhesive 505 and low-flow composite material 503. Curing the uncured molded rotor yoke 501 is accomplished by applying at least one of heat, pressure, and time. In alternative embodiment, the curing of rotor yoke molded rotor yoke 501 may involve subjecting molded rotor yoke 501 to a vacuum. Another alternative embodiment involves releasably coupling first tool 509 and second tool 511, via fasteners 521a and 521b, while allowed uncured molded rotor yoke 501 to soak at an ambient temperature environment. The specific amount of variables such as heat, pressure, or time, depend up on at least the specific curing requirements of the low-flow composite material 503 and high-flow adhesive 505 used to form molded rotor yoke 501.

The location of bleed outs 519a and 519b may be located anywhere on tool 507 that allows high-flow adhesive 505 to escape or bleed out during the curing process; however, it is preferred that bleed outs 519a and 519b be located on the upper side of tool 507 so as to prevent the introduction of air bubbles into molded rotor yoke 501.

FIG. 5 depicts molded rotor yoke 501 after the curing cycle has been completed. Bleed outs 519a and 519b have been removed from molded rotor yoke 501 by force and then lightly sanded to remove any sharp edges. Layer of high-flow adhesive 505 has decreased in thickness due to partially bleeding out during the curing process.

Figure 6:
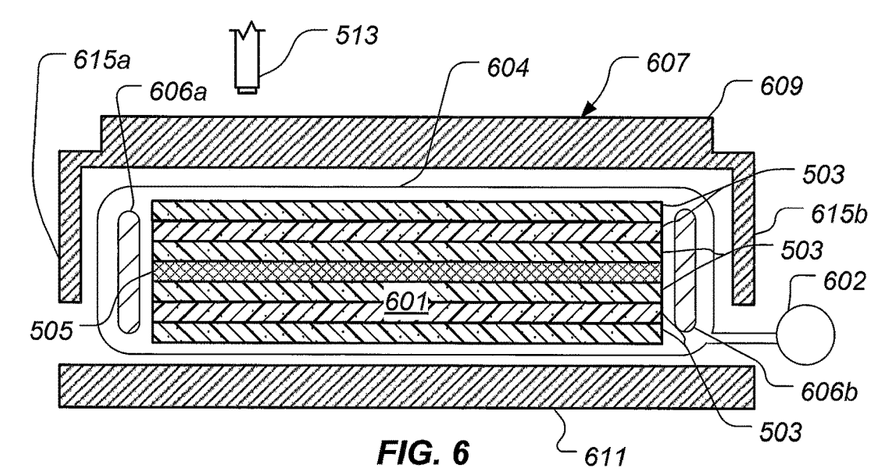
FIGS. 6-8 are stylized, cross-sectional views depicting the method of manufacturing a composite molded rotor yoke according to an alternative embodiment of the present application.
Figure 7:
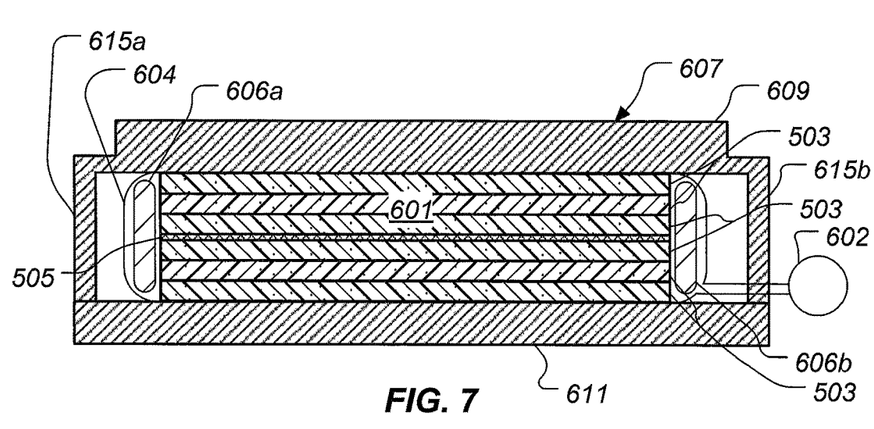
Figure 8:
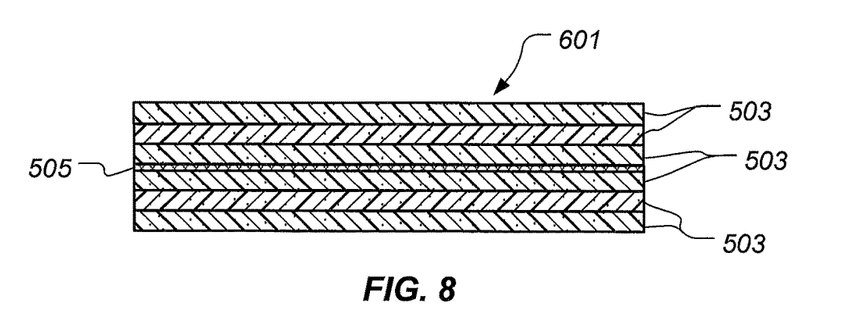

Referring to FIGS. 6-8 in the drawings, an alternative embodiment of a composite molded rotor yoke 601 of rotor yoke 901 (shown in FIG. 10) is fabricated by applying a plurality of layers of uncured low-flow composite material 503 and a layer of high-flow adhesive 505 into a closed cavity tool 607. Note that the geometric configuration of tool 607 is merely exemplary of the widely diverse geometric configurations of closed cavity tools contemplated by the present application. Closed cavity tool 607 preferably has a rigid first tool 609 and a rigid second tool 611. However, closed cavity tool 607 may also have a semi-rigid first tool 609, a semi-rigid second tool 611, or any combination of semi-rigid and rigid tools 609 and 611. It should be appreciated that tools 609 and 611 may be split into multiple tools. For example, first tool 609 may be formed as two separate tools. Closed cavity tool 607 provides tolerance and contour control by conforming the primary surfaces of molded rotor yoke 601 to the inside surfaces of closed cavity tool 607. Closed cavity tool 607 may also be referred to as a "two-sided" tool or other language describing that tool 607 substantially encloses molded rotor yoke 601.

Uncured, composite molded rotor yoke 601 is formed when the desired number of layers, also referred to as "plies", of low-flow composite material 503 and high-flow adhesive 505 have been applied into tool 607, in the desired geometry. Layers of low-flow composite material may be laid by hand, or by fiber placement machine 513. High-flow adhesive 505 may also be laid by hand, or by a machine similar to fiber placement machine 513. Closed cavity tool 607 is capable of compressing molded rotor yoke 601 into a desired thickness and geometry. Closed cavity tool 607 may include stops 615a and 615b so that first tool 609 and second tool 611 of tool 607 will stop the compression of molded rotor yoke 601 at the desired thickness of molded rotor yoke 601. It should be appreciated that stops 615a and 615b may be alternatively integrated into second tool 611, or stops 615a and 615b may be separate parts while remaining configured to stop the compression of first tool 609 and second tool 611 at the appropriate desired thickness of molded rotor yoke 601.

Uncured low-flow composite material 503 preferably includes glass fibers disposed in an uncured epoxy, in the form of a prepreg, although the present application contemplates other materials for molded rotor yoke 601. An example of low-flow composite material 503 is HexPly 8552 made by Hexcel Composites. For this application, the term "prepreg" is typically sheets of fibers impregnated in uncured epoxy or adhesive. Uncured low-flow composite material 503 can then be cut to size and laid into tool 607, either by hand or with fiber placement machine 513. Low-flow composite material 503, if used in the absence of high-flow adhesive 505, could be any composite material that has such a high viscosity so as to possibly produce marcels when subjected to a curing process inside a closed cavity tool 607. "Marcels" are wrinkles in the fiber structure of a composite that severely compromise the structural integrity of a composite part. Marcels are often created when low-flow composite material 503, if used in the absence of high-flow adhesive 505, is forced to conform to inside surfaces of closed cavity tool 607, causing the highly viscous epoxy to flow and distort fibers. Complete curing of the distorted fibers, or marcels, causes the fibers to be permanently fixed in the marcelled state.

Closed cavity tool 607 preferably does not have side tools or bleed out portions; instead, tool 607 has space around the periphery of molded rotor yoke 601 for an absorbent material 606a and 606b. Absorbent material 606a and 606b functions at least to absorb high-flow adhesive 505 as it bleeds outs of molded rotor yoke 601 during the curing process, as further explained below. Additionally a vacuum bag 604 is configured in order for a vacuum pump 602 to draw a vacuum on molded rotor yoke 601 during the curing process. The drawing of a vacuum on molded rotor yoke 601 during the curing process acts to help remove air bubbles from molded rotor yoke 601. Though vacuum bag 604 is shown as encapsulating only molded rotor yoke 601, it should be appreciated that in some embodiments vacuum bag 604 may also surround either first tool 609, second tool 611, or both first tool 609 and second tool 611. It should be appreciated that other materials, such as a breather material, may be used in conjunction with vacuum bag 604 in order to draw a vacuum on molded rotor yoke 601.

The system of the present application seeks to at least prevent the formation of "marcels" by applying layers of uncured low-flow composite material 503, as well as a layer of uncured high-flow adhesive 505, in a configuration to produce molded rotor yoke 601. In an alternative embodiment, a plurality of layers of high-flow adhesive 505 may also be used in conjunction with a plurality of layers of low-flow composite material 503, to form molded rotor yoke 801 (see FIG. 9). The use of uncured high-flow adhesive 505 in conjunction with low-flow composite material 503 provides a material with low viscous properties that easily bleeds out of molded rotor yoke 601 during curing, thereby preventing the formation of marcels. An example of high-flow adhesive 505 is AF163 made by 3M. High-flow adhesive 505 is preferably, in its uncured state, a film, but may also be a paste. High-flow adhesive 505 may also be impregnated with fibers or scrim in order to tailor strength and final thickness control.

FIG. 7 depicts molded rotor yoke 601 during the curing process. Closed cavity tool 607 has been compressed in order to rid the part of any voids, or air bubbles, and to conform molded rotor yoke 601 to the primary contours of two sided tool 607. Mechanical stops 615a and 615b of first tool 609 are shown in contact with second tool 611. Contact between stops 615a and 615b, and second tool 611, signify the desired final thickness of molded rotor yoke 601 has been reached. During this process, high-flow adhesive 505 bleeds into absorbent material 606a and 606b due to compression of tool 607 and the drawing of a vacuum through vacuum pump 602. During curing, high-flow adhesive 505 may either partially or completely bleed out from molded rotor yokes 601 and 801, depending on the parameters controlling compression of tool 607. Because high-flow adhesive 505 has a lower viscosity than that of low-flow composite material 503, high-flow adhesive 505 bleeds out of tool 607 instead of low-flow composite material 503. In some embodiments, the viscosity difference between high-flow adhesive 505 and low-flow composite material 503 may not be large, which could result in a small amount of resin from low-flow composite material 503 with the high-flow adhesive 505 bleeding into absorbent material 606a and 606b. Curing the uncured molded rotor yoke 601 is accomplished by applying at least one of heat, pressure, and time. An alternative embodiment involves releasably coupling first tool 609 and second tool 611, via fasteners while allowed uncured molded rotor yoke 601 to soak at an ambient temperature environment. The specific amount of variables such as heat, pressure, or time, depend up on at least the specific curing requirements of the low-flow composite material 503 and high-flow adhesive 505 used to form molded rotor yoke 601.

FIG. 8 depicts molded rotor yoke 601 after the curing cycle has been completed. The layer of high-flow adhesive 505 has decreased in thickness because of adhesive 505 partially bleeding out during the curing process.

Figure 9:
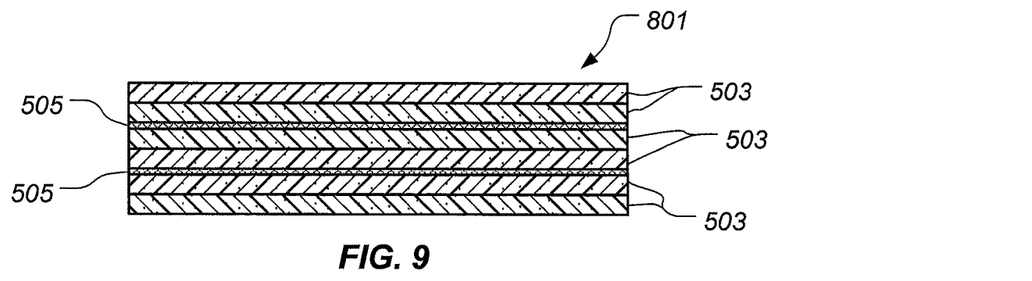
FIG. 9 is a stylized, cross-sectional view of a molded rotor yoke according to an alternative embodiment of the present application.

FIG. 9 depicts an alternative embodiment of molded rotor yoke 801 that was formed by either the process used to form molded rotor yoke 501 or molded rotor yoke 601, except that a plurality of layers of high-flow adhesive 505 were used. Multiple layers of high-flow adhesive 505 allows for a greater amount of high-flow adhesive 505 available for bleed out. Using a plurality of layers of high-flow adhesive 505 can be advantageous for many reasons, such as for tailoring the material properties of molded rotor yoke 801, as well as for allowing for greater contour variation in tools 507 and 607.

Figure 10:
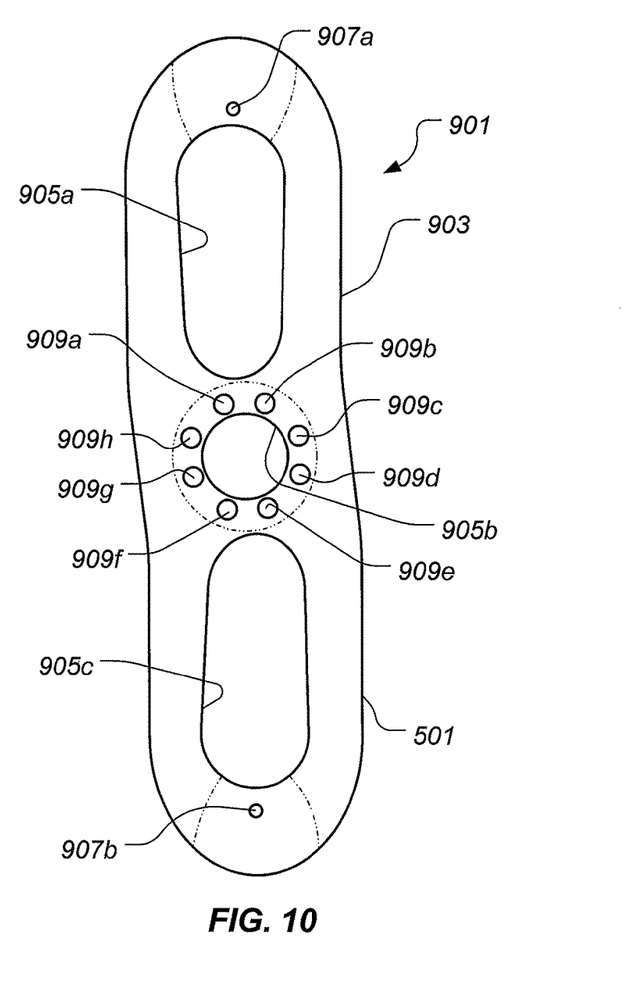
FIG. 10 is a top, plan view of a composite rotor yoke according to the preferred embodiment of the present application.

FIG. 10 depicts a preferred embodiment of a rotorcraft rotor yoke 901. Rotor yoke 901 is preferably made from molded rotor yoke 501, but may also be made from molded rotor yoke 601 or 801. Rotor yoke 901 exemplifies features that may be machined into molded rotor yokes 501, 601, and 801 using a machining tool such as a five-axis machine tool. Such features include: inner openings 905a, 905b, and 905c, outer periphery 903, rotor blade attachment holes 907a and 907b, and mast attachment holes 909a-909h, to name a few. Rotor yoke 901 is formed when all machining operations are complete. It should be noted that, in one embodiment, molded rotor yoke 501, 601, and 801 are oversized, i.e., is larger in physical dimensions than rotor yoke 901 to provide material for removal during a machining process to form machine outer periphery 903 (shown in FIG. 10). Moreover, dimensions of openings 905a, 905b, and 905c maybe incorporated into molded rotor yokes 501, 601, or 801 and then increased in size by a subsequent machining operation.

Figure 11:
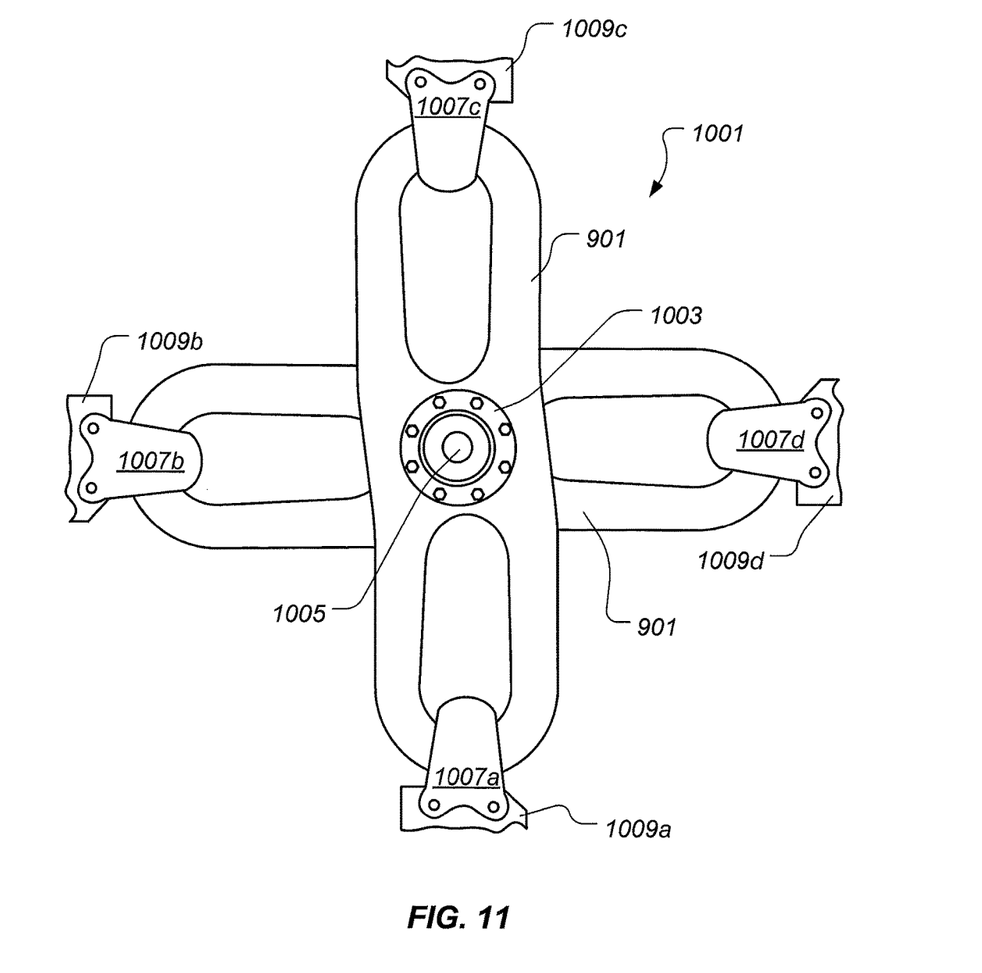
FIG. 11 is a top, plan view of a rotor hub incorporating a pair of composite rotor yokes of FIG. 10 according to the preferred embodiment of the present application.

FIG. 11 depicts the preferred embodiment of a rotor hub 1001 comprising a pair of rotor yokes 901, a coupling 1003 that mechanically couples rotor yokes 901 to a mast 1005, and fittings 1007a-1007d that mechanically couple rotor yokes 901 to rotor blades 1009a-1009d, respectively. The configuration of rotor hub 1001 depicted in FIG. 11 is merely exemplary of the widely various embodiments of rotor hub 1001 contemplated by the present application.

It should be noted, that the methods disclosed in the present application can be applied to form composite structures other than rotor yoke 901 or molded rotor yokes 501, 601, and 801. Any composite structure that uses low-flow composite material 503 that is susceptible to marcelling, or other fiber distortion, during compression in a closed cavity tool such as closed cavity tools 507 or 607, would benefit from the methods disclosed in the present application. Examples of composite structures that would fall into this category include, but not limited to, composite structures used in aircraft, wind turbines, automobiles, marine vehicles, etc.

The system of the present application provides significant advantages, including: (1) ability to use two-side tooling while providing a composite rotor yoke without marcelling of the reinforcing fibers thereof; (2) enabling the use of toughened, low-flow resins in composite rotor yokes in a closed cavity tool; and (3) providing a composite rotor yoke that requires less composite fabrication time, cost, and effort with less part-to-part variation than conventional rotor yokes.

The particular embodiments of the system of the present application disclosed may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the present application. Accordingly, the protection sought herein is as set forth in the claims below. It is apparent that a system with significant advantages has been described and illustrated. Although the system of the present application is shown in a limited number of forms, it is not limited to just these forms, but is amenable to various changes and modifications without departing from the spirit thereof.

What is claimed is:

1. An uncured rotor yoke, comprising:
    layers of uncured low-flow composite material, the low-flow composite material comprising fibers impregnated in uncured epoxy or adhesive; and
    at least one layer of uncured high-flow adhesive, the layer of high-flow adhesive lacking fibers impregnated therein,
    wherein the layers of uncured low-flow composite material and the at least one layer of uncured high-flow adhesive are arranged in a configuration to produce an uncured molded rotor yoke;
    wherein the at least one layer of high-flow adhesive is directly between two of the layers of uncured low-flow composite material; and
    wherein the high-flow adhesive has a lower viscosity than the low-flow composite material.

2. The uncured rotor yoke according to claim 1, wherein the low-flow composite material comprises glass fibers.

3. The uncured rotor yoke according to claim 1, wherein the layers of low-flow composite material and the at least one layer of uncured high-flow adhesive are enclosed in a closed cavity tool.

4. The uncured rotor yoke according to claim 3, wherein the closed cavity tool comprises a first tool and a second tool configured to be compressed together so as to compress the layers of low-flow composite material and the at least one layer of uncured high-flow adhesive.

5. The uncured rotor yoke according to claim 1, wherein the layers of low-flow composite material and the at least one layer of uncured high-flow adhesive are enclosed in a vacuum bag.

6. A rotor yoke manufactured by a process comprising:
    preparing a molded rotor yoke in a closed cavity tool, comprising:
    applying layers of uncured low-flow composite material, the low-flow composite material comprising fibers impregnated in uncured epoxy or adhesive, and a layer of uncured high-flow adhesive, the layer of high-flow adhesive lacking fibers impregnated therein, the layers being applied in a configuration to produce an uncured molded rotor yoke, the layer of high-flow adhesive being placed directly between two of the layers of uncured low-flow composite material;

substantially enclosing the uncured molded rotor yoke in the closed cavity tool, wherein the closed cavity tool comprises a first tool and a second tool;

forcing the first tool and the second tool together, so as to compress the uncured molded rotor yoke;

curing the uncured molded rotor yoke; and machining a peripheral edge of the cured molded rotor yoke;

wherein the forcing of the first tool and the second tool together so as to compress the uncured molded rotor yoke forces at least a portion of the uncured high-flow adhesive to bleed out.

7. The rotor yoke of claim 6, the process further comprising:

machining at least one portion of the molded rotor yoke to form the rotor yoke;

wherein the machining of at least one portion of the molded rotor yoke to form the rotor yoke includes machining the cured molded rotor yoke to form mast attachment holes.

8. The rotor yoke of claim 6, wherein the curing of the uncured molded rotor yoke includes applying at least one of heat, pressure, and time.

9. The rotor yoke of claim 8, wherein the curing of the uncured molded rotor yoke further includes releasably coupling the first tool and the second tool together while allowing the molded rotor yoke to soak at an ambient temperature environment.

10. The rotor yoke of claim 6, wherein the applying of the layers of an uncured low-flow composite material and the layer of uncured high-flow adhesive includes an automated fiber placement machine.

11. The rotor yoke of claim 6, wherein the uncured low-flow composite material comprises a plurality of glass fibers.

12. The rotor yoke of claim 6, wherein the preparing of the molded rotor yoke further comprises:

drawing a vacuum in a vacuum bag enclosed around the molded rotor yoke.

13. The rotor yoke of claim 6, wherein at least one of the first tool and second tool comprises multiple tools.

14. The rotor yoke of claim 6, wherein the closed cavity tool further comprises:

at least one side tool adjacent to a periphery of the molded rotor yoke.

15. The rotor yoke of claim 6, wherein the closed cavity tool further comprises at least one tool stop for controlling a thickness of the molded rotor yoke.

16. The rotor yoke of claim 6, wherein the preparing of the molded rotor yoke further comprises:

applying an absorbent material around a periphery of the uncured molded rotor yoke for absorbing any bleed out of the high-flow adhesive.

\* \* \* \* \*